US008832561B2

(12) United States Patent
Nurminen et al.

(10) Patent No.: US 8,832,561 B2
(45) Date of Patent: Sep. 9, 2014

(54) AUTOMATIC INITIATION OF COMMUNICATIONS

(75) Inventors: Jukka K. Nurminen, Espoo (FI); Zoltan Ivanfi, Gödöllo (HU); Balazs Bakos, Törökbálint (HU)

(73) Assignee: Nokia Corporation, Espoo (FI)

( * ) Notice: Subject to any disclaimer, the term of this patent is extended or adjusted under 35 U.S.C. 154(b) by 1598 days.

(21) Appl. No.: 11/137,475

(22) Filed: May 26, 2005

(65) Prior Publication Data

US 2006/0271619 A1 Nov. 30, 2006

(51) Int. Cl.
*G06F 3/00* (2006.01)
(52) U.S. Cl.
USPC ........................................................ 715/739
(58) Field of Classification Search
USPC ......... 715/752, 753, 758, 817, 205–208, 705, 715/708–711, 714–715, 738–740, 808–810, 715/825–826, 847, 864
See application file for complete search history.

(56) References Cited

U.S. PATENT DOCUMENTS

| | | | |
|---|---|---|---|
| 4,972,457 A | 11/1990 | O'Sullivan | |
| 5,719,925 A | 2/1998 | Peoples | |
| 6,035,214 A | 3/2000 | Henderson | |
| 6,370,394 B1 | 4/2002 | Anttila | |
| 6,460,084 B1 | 10/2002 | Van Horne et al. | |
| 6,772,188 B1 * | 8/2004 | Cloutier | 709/224 |
| 6,842,877 B2 * | 1/2005 | Robarts et al. | 715/708 |
| 6,870,828 B1 * | 3/2005 | Giordano, III | 370/352 |
| 7,313,617 B2 * | 12/2007 | Malik et al. | 709/225 |
| 7,313,760 B2 * | 12/2007 | Grossman et al. | 715/708 |
| 8,364,081 B1 * | 1/2013 | Zilka | 455/41.2 |
| 2002/0062251 A1 * | 5/2002 | Anandan et al. | 705/14 |
| 2002/0065041 A1 | 5/2002 | Lunsford | |

(Continued)

FOREIGN PATENT DOCUMENTS

| | | |
|---|---|---|
| EP | 0612006 A1 | 8/1994 |
| GB | 2378279 | 2/2003 |

(Continued)

OTHER PUBLICATIONS

Eiji Utsunomiya et al., "TINA-like Solutions for Implementing Computer Telephony Services", Telecommunications Information Networking Architecture Conference Proceedings, 1999, TINA '99, Oahu, HI, USA, Apr. 12, 1999, http://ieeexplore.ieee.org/iel5/6418/17142/00789998.pdf?arnumber=789998.

(Continued)

*Primary Examiner* — Enrique Iturralde
(74) *Attorney, Agent, or Firm* — Locke Lord LLP

(57) ABSTRACT

A selection of a contact is received from a user. This contact is within a content item, such as a word processing document, a hypertext document, an e-mail, a spreadsheet, or an electronic presentation. The user receives an indication of one or more connection channels associated with the contact and the user makes a selection a designated connection channel from the one or more connection channels. Upon this selection a device (such as a portable communications device) is instructed to establish communications across the designated connection channel. This connection channel may be, for example, a telephone number, an SMS number, an e-mail address, or a uniform resource locator (URL).

40 Claims, 11 Drawing Sheets

(56) References Cited

U.S. PATENT DOCUMENTS

| | | | |
|---|---|---|---|
| 2003/0112948 | A1 | 6/2003 | Brown et al. |
| 2004/0078488 | A1 | 4/2004 | Patrick |
| 2004/0122951 | A1* | 6/2004 | Beck et al. .................... 709/227 |
| 2004/0267887 | A1* | 12/2004 | Berger et al. ................ 709/206 |
| 2005/0034147 | A1* | 2/2005 | Best et al. ....................... 725/10 |
| 2005/0136886 | A1* | 6/2005 | Aarnio et al. .............. 455/404.2 |
| 2005/0149487 | A1* | 7/2005 | Celik ................................ 707/1 |
| 2005/0204900 | A1 | 9/2005 | Burton |
| 2006/0107307 | A1* | 5/2006 | Knox et al. ....................... 726/2 |
| 2006/0142005 | A1 | 6/2006 | Takaluoma et al. |

FOREIGN PATENT DOCUMENTS

| | | |
|---|---|---|
| JP | 10-164171 | 6/1998 |
| JP | 10-174164 | 6/1998 |
| KR | 20020094782 | 12/2002 |
| WO | WO 99/12325 A1 | 3/1999 |
| WO | WO01/31930 A2 | 5/2001 |
| WO | WO 2005/006165 A1 | 1/2005 |
| WO | WO 2005/038678 A1 | 4/2005 |
| WO | WO 2005/104481 A1 | 11/2005 |

OTHER PUBLICATIONS

Internet document: The Java Community Process (SM) Program, JSRs: Java Specification Requests, JSR 253: Mobile Telephony API (MTA), http://jcp.org/en/jsr/detail?id=253 (downloaded Aug. 24, 2005).

Internet document: TAPI (Telephony Application Program Interface), SearchExchange.com Definitions—powered by whatis.com, http://searchexchange.techtarget.com/sDefinition/0,,sid43_gci213092,00html (downloaded Aug. 24, 2005).

Internet document: Complete tasks quickly with Smart Tags in Office XP, Microsoft Corporation, http://office.microsoft.com/en-us/assistance/HA010347451033.aspx (downloaded 2005).

Gnokki Project, "Controlling a Symbian Phone (Nokia 6660) from Linux" (downloaded from www.gnokki.org).

Internet document: Gnokii FAQ, Gnokii, Version 0.6.8, http://www.gnokii.org./faq.shtml (downloaded Oct. 3, 2005).

International Search Report dated Oct. 23, 2006.

U.S. Appl. No. 11/258,131, filed Oct. 26, 2005, Jukka Nurminen et al.

Foreign Communication from the Intellectual Property Office of Singapore dated Mar. 23, 2009.

Internet document: http://www.crystalvoice.com/VOIP_Click-to-talk.htm on Oct. 26, 2005 . . . Products—Click-to-Talk, 2005 CrystalVoice Communications.

CrystalVoice Communications, Inc., Click-to-Talk . . . Enhancing the Web Experience, Feb. 28, 2005 (downloaded from http://www.crystalvoice.com/VOIP_Click-to-talk.htm on Oct. 26, 2005).

* cited by examiner ics in a variety of situations and locations. For instance, wireless e-mail messaging, web browsing, and voice telephony are becoming commonplace in retail businesses, restaurants, airports, offices, conference rooms, and even vehicles.
AUTOMATIC INITIATION OF COMMUNICATIONS

FIELD OF THE INVENTION

The present invention relates to communications. More particularly, the present invention relates to techniques that provide for the efficient initiation of communications from various user applications.

BACKGROUND OF THE INVENTION

As mobile communications services have become widespread, people increasingly require data and voice communications in a variety of situations and locations. For instance, wireless e-mail messaging, web browsing, and voice telephony are becoming commonplace in retail businesses, restaurants, airports, offices, conference rooms, and even vehicles.

In addition to the rise of wireless communications, portable computing devices (such as laptop computers and personal digital assistants (PDAs)) are also frequently used in the aforementioned situations and locations where mobile communications are desired. In fact, such mobile communications often arise from information that is displayed by the portable computing devices in electronic documents. Examples of such information include names, telephone numbers, and e-mail addresses.

Typically, the initiation of communications based on this information requires manual entry of corresponding data. For instance, this manual entry may involve dialing a telephone number, typing an e-mail address, or accessing an entry in an electronic address book through multiple keystrokes on a communications device's keypad.

Accordingly, there is a need to provide efficient initiation of communications from information displayed by computing devices.

In certain situations, computing devices and communications devices are distinct from each other. However, such distinct devices may be able to communicate through wired or wireless connections. For example, wired connections may be provided through serial, parallel, or local area network connections, while wireless connections may be provided by Bluetooth or wireless local area networks (WLANs).

Presently, such connections are not utilized to streamline the initiation of communications.

SUMMARY OF THE INVENTION

The present invention provides techniques for the efficient initiation of communications. For instance, the present invention provides a method that receives a selection of a contact from a user. This contact is within a content item, such as a word processing document, a hypertext document, an e-mail, a spreadsheet, or an electronic presentation. The user receives an indication of one or more connection channels associated with the contact and the user makes a selection of a designated connection channel from the one or more connection channels. Upon this selection, a device (such as a portable communications device) is instructed to establish communications across the designated connection channel. This connection channel may be, for example, a telephone number, an SMS number, an e-mail address, or a uniform resource locator (URL).

In addition, the method may automatically identify one or more contacts within a portion of the content item. These automatically identified contacts may be visually indicated to the user. Further, the device may be instructed to send the portion of the content item (either "as is" or with user edits) across the designated connection channel. Alternatively or additionally, the user may be provided with an opportunity to enter a message, which the device is instructed to send across the designated connection channel.

The device may provide contact information. For instance, the method may include sending to the device a query regarding the selected contact, and, in response to the query, receiving at least one of the one or more connection channels from the device.

An apparatus provided by the present invention may include a user interface and a controller. The user interface presents a content item to a user and receives from the user a selection of a contact within the content item. The controller obtains one or more connection channels that are associated with the contact. In addition, the controller instructs a device to establish communications across a designated connection channel from the one or more connection channels. This designated connection channel is selected by the user through interaction with the user input device. The apparatus may also send to the device a query regarding the selected contact. In response to the query, at least one of the one or more connection channels are received from the device. Moreover, the apparatus may include a parsing engine configured to identify one or more potential contacts from the content item.

A computer program product of the present invention includes program code for enabling a processor to perform various operations. Examples of these operations include receiving from a user a selection of a contact within a content item; indicating to the user one or more connection channels associated with the contact; receiving from the user a selection of a designated connection channel from the one or more connection channels; and instructing a device to establish communications across the designated connection channel.

A system of the present invention includes a first device, a second device, and a communications link between these devices. The first device presents a content item to a user and receives from the user a selection of a contact within the content item. The second device establishes communications across a designated connection channel. This designated connection channel is from one or more connection channels that correspond to the selected contact. Through employment of the communications link, the first device obtains from the second device the one or more connection channels that correspond to the selected contact, and directs the second device to establish communications across the designated connection channel.

Further features and advantages of the present invention will become apparent from the following description, claims, and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
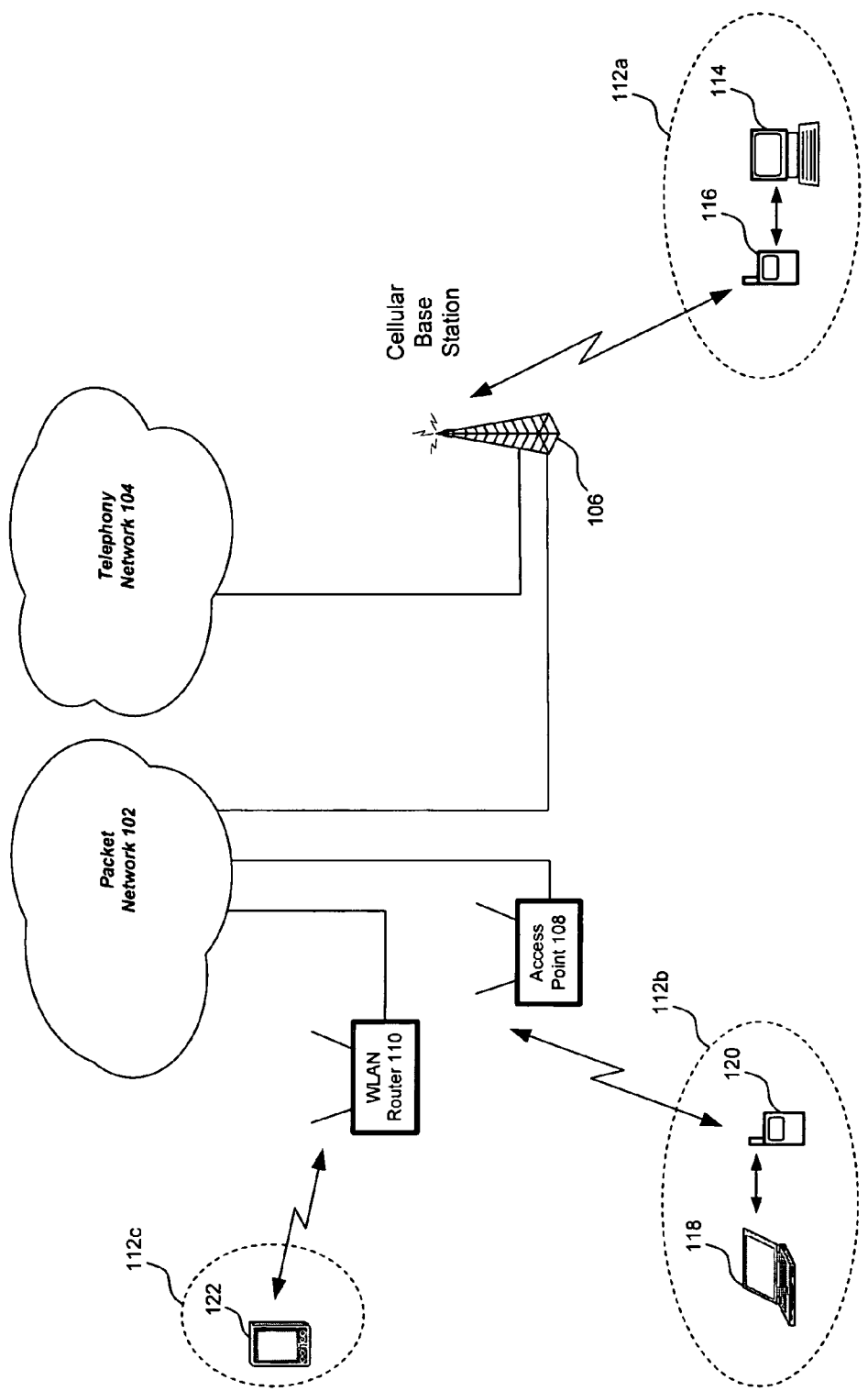
FIG. 1 is a diagram of an exemplary operational environment.

Before describing the invention in detail, it is first helpful to describe an environment in which the present invention may be employed. Accordingly, FIG. 1 is a diagram of an exemplary operational environment. In this environment, devices may communicate across a packet network 102 (such as the Internet) and/or a telephony network 104.

Such communications may be initiated from various arrangements of user devices. For instance, FIG. 1 shows a location 112a in which a desktop computer 114 is operating with a mobile communications device 116 (such as a wireless telephone) to access networks 102 and 104 through a cellular base station 106.

Also, at a location 112b a laptop computer 118 operates with a mobile communications device 120 to reach network 102 via a short-range wireless (e.g., Bluetooth) access point 108. Moreover, at a location 112c, a WLAN capable PDA 122 is accessing packet network 102 via a wireless router 110.

In embodiments of the present invention, these devices may efficiently initiate such communications from information provided by content items (e.g., documents, web pages, and e-mails). Such content items may be displayed by desktop computer 114, laptop computer 118, and PDA 122.

II. Devices

Figure 2:
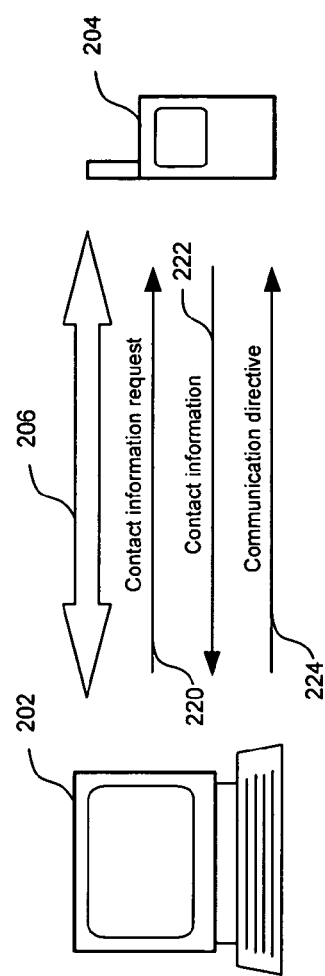
FIG. 2 is a diagram of an exemplary arrangement of user devices, according to embodiments of the present invention.

FIG. 2 is a diagram of an exemplary arrangement of user devices, according to aspects of the present invention. As shown in FIG. 2, this arrangement includes a computing device 202 and a mobile communications device 204. As discussed above with reference to FIG. 1, computing device 202 may be, for example, a desktop or laptop computer, a television device, a personal video recorder (PDR), or a digital video recorder (DVR). Alternatively, computing device 202 may be a handheld device having wireless capabilities, such as a PDA, a mobile communication device, a portable audio/video device, a portable TV device, a digital camera, a digital camcorder, a global positioning system (GPS) device, or any combination thereof. Mobile communications device 204 may be a wireless (e.g., cellular) telephone. Moreover, mobile communications device 204 may be a PDA having wireless capabilities, such as cellular, Bluetooth, and/or IEEE 802.11 Wireless Local Area Network (WLAN) capabilities.

Alternatively, computing device 204 may be a handheld device having wireless capabilities, a portable audio/video device, a portable TV device, a digital camera, a digital camcorder, a global positioning system (GPS) device, or any combination thereof. Also, computing device 204 may be a desktop or laptop computer, a television device, a personal video recorder (PDR), or a digital video recorder (DVR) having wireless capabilities.

FIG. 2 shows that devices 202 and 204 exchange information across a communications link 206. This link may be either wired or wireless. For instance, link 206 may utilize a cable connection, such as a USB interface or an Ethernet connection. Alternatively, link 206 may provided by a short-range wireless communications network that utilizes wireless RF transmissions. Examples of such networks include Bluetooth, active or passive radio frequency identification (RFID), ultra wideband (UWB), wireless fidelity (WiFi), and WLAN. In further alternatives, link 206 may be provided through optical techniques. For instance, link 206 may be provided by an Infrared Data Association (IrDA) connection.

Devices 202 and 204 may exchange various messages across link 206. For example, FIG. 2 shows a request 220 sent from device 202 to 204. In embodiments, request 220 is directed at obtaining contact information from mobile communications device 204. Upon receipt of this request, device 204 searches one or more databases, such as its address book, to determine whether any entries satisfy request 220. If so, then mobile communications device 204 generates a response 222 that includes information from such entries. As shown in FIG. 2, response 222 is sent to computing device 202 across link 206.

In addition, computing device 202 may send (across link 206) a communication directive 224 to mobile communications device 204. This directive instructs mobile communications device 204 to initiate wireless communications. For instance, directive 224 may instruct device 204 to place a phone call, transmit a short messaging service (SMS) message, send an e-mail, and/or initiate other forms of communication. These directives may include telephony AT commands generated by software tools. Examples of such software tools include currently avaiable Gnokii, Gnapplet, and Gammu, which are toolkits that allow a Linux PC connected to a phone to make calls.

In embodiments of the present invention, such messages may be employed to provide efficient initiation of communications from, for example, information presented by applications running on computing device 202. In this case, the information is also transmitted across link 206. Alternatively, computing device 202 and mobile communication device 204 may transmit information across one or more other communication links or means.

Figure 3:
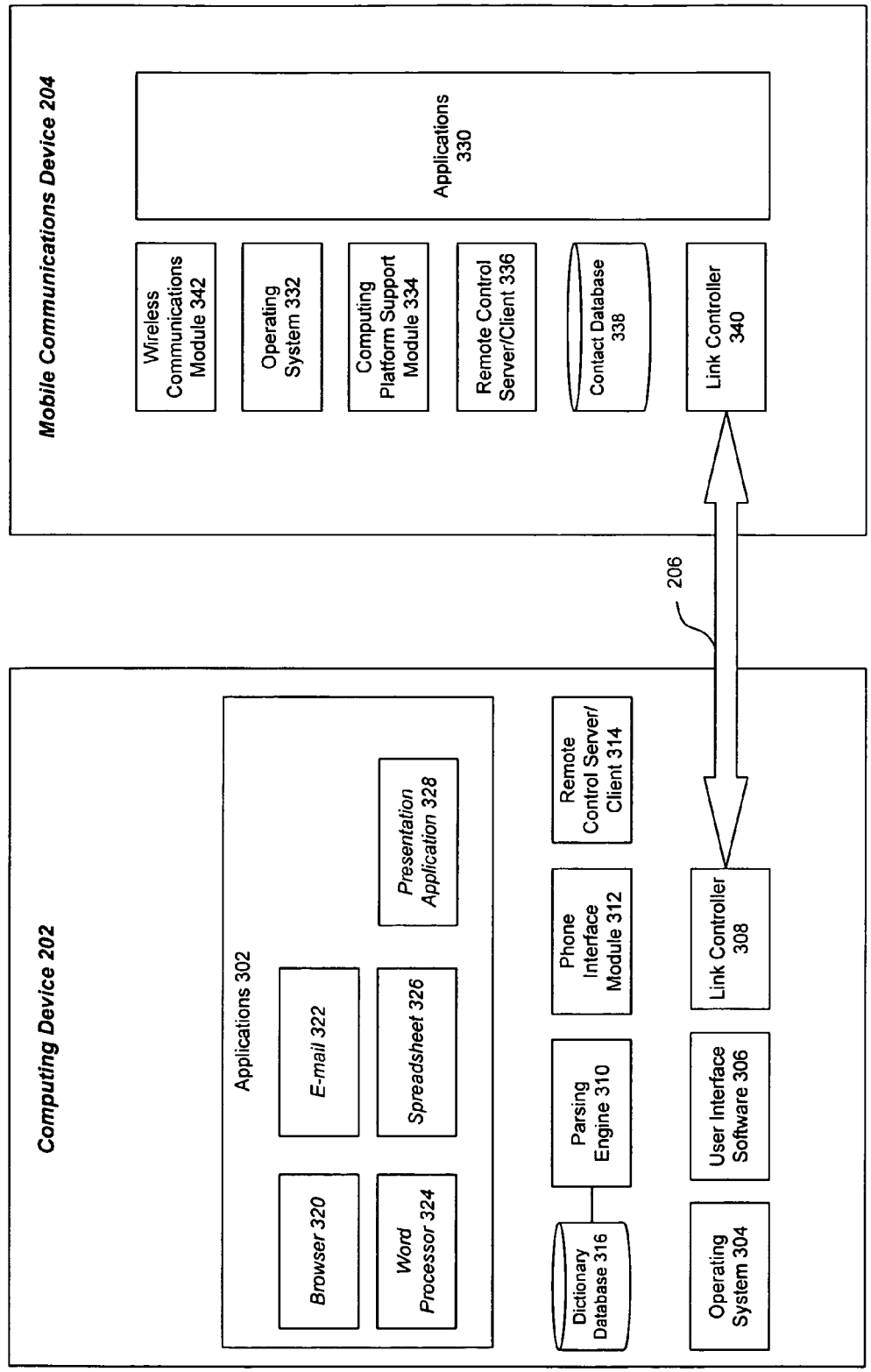
FIG. 3 is a block diagram showing an architecture of databases and software components, according to embodiments of the present invention.

FIG. 3 is a block diagram showing an architecture that may employed in computing device 202 and mobile communications device 204. This architecture may be implemented with databases and software components that are in memory and executed by one or more processors within the corresponding devices. This architecture provides devices 202 and 204 with the capability to efficiently initiate wireless communications.

The architecture of FIG. 3 includes various software modules. For instance, FIG. 3 shows computing device 202 having a plurality of applications 302, an operating system 304, user interface software 306, a link controller 308, a parsing engine 310, phone interface controller 312, a remote control server/client module 314, and a dictionary database 316.

As shown in FIG. 3, applications 302 may include software, such as a browser 320, an e-mail application 322, a word processor 324, a spreadsheet application 326, and a presentation development application 328. These applications are shown for purposes of illustration, and not limitation. Accordingly, computing device 202 may include additional or alternative applications.

Operating system 304 provides a software platform upon which other programs can operate. For instance, operating system 304 provides a file system and security features. Also, operating system 304 handles the allocation of processing resources among multiple processes. In addition, operating system 304 may provide various functional utilities that can be employed by other programs.

User interface software 306 allows a user to interact with various software applications and/or modules to operate computing device 202 according to the techniques of the present invention. For example, FIG. 3 shows that user interface software 306 provides for user interaction with applications 302. In embodiments of the present invention, this interaction facilitates the efficient initiation of wireless communications from information content that applications 302 provide to its users. User interface software 306 also includes components, such as device drivers, that control the operation of user interface devices, such as displays, speakers, microphones, keypads, and/or touch screen displays.

Link controller 308 handles link level control and functionality for communications with mobile communications device 204 across communications link 206. For example, in Bluetooth implementations, link controller 308 handles link operations, such as device discovery, and paging. In handling these operations, link controller 308 interacts with hardware portions of within computing device 202, such as wireless transceivers, interface circuitry, and/or the like.

In addition to communications link 206, the computing device 202 may support communications links with other devices and networks, such as cellular data and telephony networks, as well as short-range wireless networks. Accordingly, a wireless communications module (not shown) controls the operation of components, such as transceivers, that provide for communications over such additional links.

Parsing engine 310 operates with one or more of applications 302 to identify potential communications contacts within a content item. Examples of content items include word processing documents, e-mails, web pages, spreadsheets, and presentation documents. For example, parsing engine 310 may search for names and formatted information.

Dictionary database 316 stores terms, such as common names and proper nouns. Parsing engine 310 may cross-reference these terms to identify potential contacts within a content item. Dictionary database 316 may be implemented in various ways. For example, this database may be a relational database, an object oriented database, or other suitable database implementation.

Phone interface controller 312 provides a user of computing device 202 with the capability to formulate queries or requests. These requests are submitted to mobile communications device 204. In response, computing device 202 may receive information from mobile communications device 204 including, for example, contact information and/or communications addresses. In addition, phone interface controller 312 may generate communications directives to be sent to mobile communications device 204.

Remote control server/client module 314 provides for computing device to control (or be controlled by) another device, such as mobile communications device 204. Accordingly, module 314 may be implemented with Virtual Network Computing (VNC) software. VNC software allows a user of computing device 202 to view and interact with another device (the "server") using a simple client program (the "viewer").

FIG. 3 shows that mobile communications device 204 includes one or more applications 330, an operating system 332, computing platform support 334, a remote control server/client 336, a contact database 338, interface manager 340, and wireless communications module 342.

Applications 330 may include personal information management applications, such as an address book, and/or a calendar.

Operating system 332 (like operating system 304) provides a software platform upon which other programs can operate. This is done by providing, for example, a file system, security features, mechanisms that allocate processing resources among multiple processes. In addition, operating system 304 may provide various functional utilities that can be employed by other programs.

Computing platform support module 334 may process messages received from computing device 202. Examples of such messages include request 220 and communications directive 224. In addition, computing platform support module 334 may process received requests and formulate responses, such as response 222. Also, computing platform support module 334 may trigger the initiation of communications in response to directives received from computing device 202.

Remote control server/client module 336 allows mobile communications device 204 to control (or be controlled by) another device, such as mobile communications device 204. Accordingly, module 336 may be implemented VNC software.

Contact database 338 stores contact information for one or more contacts. Examples of such information include names, addresses, telephone numbers, SMS numbers, e-mail addresses, and web site addresses. Such contact information may be indexed according to names of persons and/or organizations. In embodiments, personal information applications may access this information. Contact database 338 may be implemented in various ways. For example, this database may be a relational database, an object oriented database, or other suitable database implementation. Contact database 338 may be dynamic. For instance, its contents may be acquired and updated through user interaction, from a peer device, and/or from a server.

Link controller 340 handles link level control and functionality for communications with computing device 202 across communications link 206. For example, in Bluetooth implementations, link controller 340 handles link operations, such as device discovery, and paging. In handling these operations, link controller 308 interacts with hardware portions within computing device 202, such as wireless transceivers, interface circuitry, and/or the like.

In addition to communications link 206, mobile communications device 204 supports communications links with other devices and networks, such as cellular data and telephony networks, as well as short-range wireless networks. Accordingly, wireless communications module 342 controls the operation of components, such as transceivers, that provide for communications over such additional links.

As described above, the architecture of FIG. 3 may be implemented using software executing in devices 202 and/or 204. Accordingly, these devices may each include a processor (such as one or more microprocessors) and memory. This software (also referred to herein as a computer program product) is stored in its corresponding device's memory and executed by its processor. Examples of such implementations are described below with reference to FIGS. 10 and 11.

However, the present invention may be implemented as control logic in software, firmware, hardware or any combination thereof. For example, in embodiments, the invention is implemented primarily in firmware and/or hardware using, for example, hardware components such as application specific integrated circuits (ASICs). Implementation of a hardware state machine to perform the functions described herein will be apparent to persons skilled in the relevant art(s).

III. Operation

Figure 4:
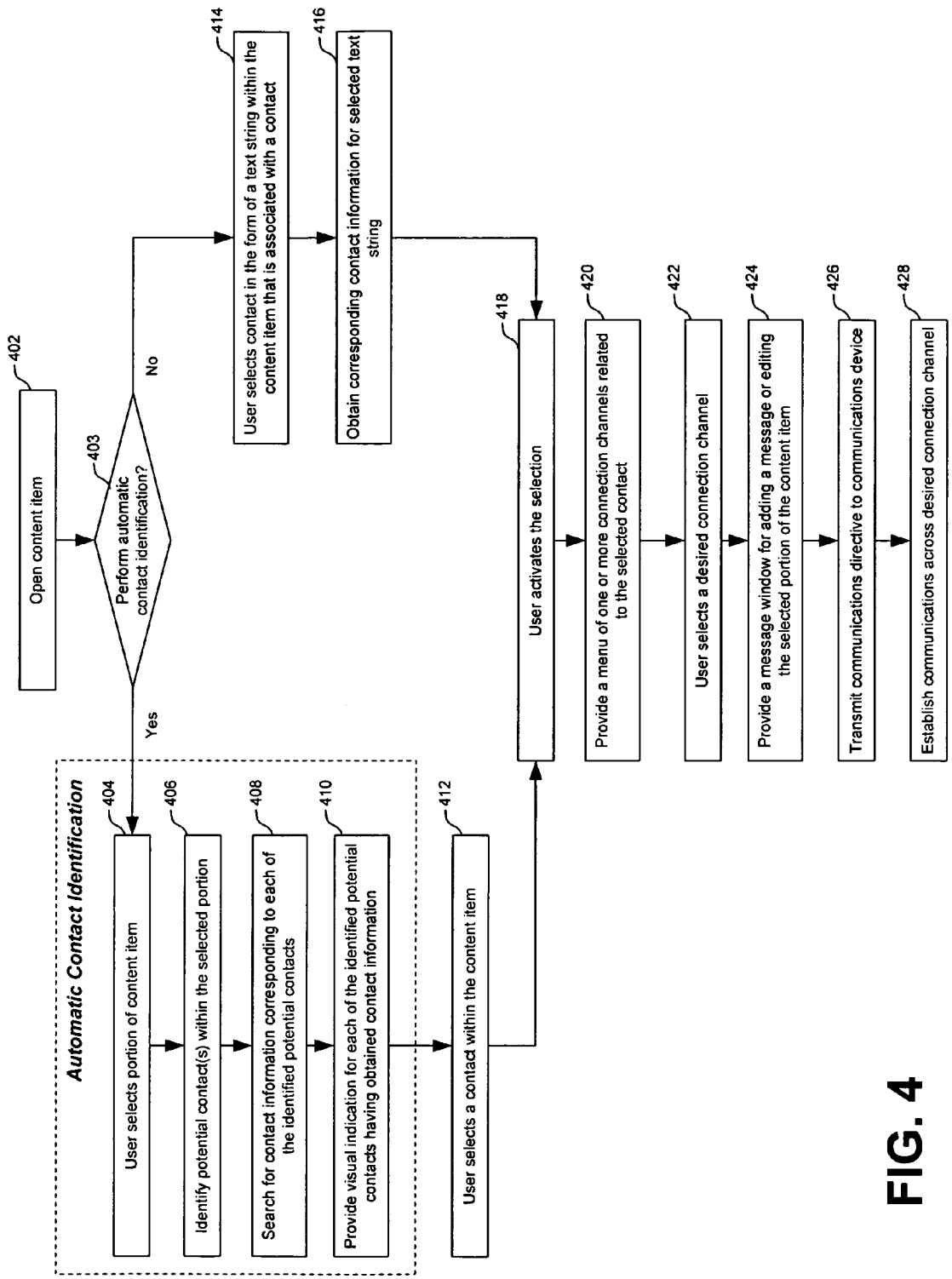
FIG. 4 is a flowchart of an operational sequence, according to embodiments of the present invention.

FIG. 4 is a flowchart of an operational sequence according to aspects of the present invention. This sequence is described in the context of a computing device (such as computing device 202) and a communications device (such as mobile communications device 204). However, in further embodiments of the present invention, this sequence may be performed by other devices. Also, this sequence may be performed by a single device or more than two devices.

In a step 402, a user of the computing device opens a content item, such as a word processing document, a web page, an e-mail, an electronic phone directory, etc. Alternatively, a user may select (e.g., highlight) a part of the content item. Based on information contained in this content item, the user may initiate wireless communications. Accordingly, as indicated by a step 403, the user may initiate an automatic contact identification process. If the user initiates this process, operation proceeds to a step 404. Otherwise, operation proceeds to a step 414.

As shown in FIG. 4, the automatic contact identification process may include steps 404 through 410. In step 404, the user selects (e.g., highlights) a portion of the content item. For example, this selection may be a paragraph, a line of text, or one or more words. Alternatively, the user may select the entire content item.

In a step 406, one or more potential contacts within the selected portion of the content item are identified. With reference to the architecture of FIG. 3, this step may comprise parsing engine 310 identifying formats (such as telephone numbers and e-mail addresses) that are indicative of communications addresses. In addition, this step may comprise parsing engine 310 operating with dictionary database 316 to identify names (e.g., names of people, businesses, entities, companies, products, brands, etc.) and/or contact information (e.g., telephone numbers, e-mail addresses, IP addresses, etc.) within the selected portion of the content item.

Following this identification, a step 408 searches for contact information corresponding to the potential contacts (e.g., names, and/or more information corresponding to the contact information). In embodiments, step 408 comprises the communication of information between devices. For example, this step may involve the computing device sending a request for contact information to the mobile communications device and/or to a server in a network. Accordingly, such a request may include the potential contacts (e.g., names, numbers, etc.) within the content item that were identified in step 406.

In response to this request, the mobile communications device or the network server searches (e.g., within contact database 338) for the corresponding contact information. Examples of such contact information include, for example, telephone numbers, SMS numbers, e-mail addresses, and uniform resource locators (URLs). The mobile communications device or network server then sends any such information to the computing device.

In embodiments, the mobile communications device may handle ambiguous partial matches of searches performed in step 408. For example, if a potential contact contains only a family name and there are two contacts stored by the mobile communications device having that family name, then both contacts could be sent to the computing device as corresponding contact information.

In a step 410, a visual indication corresponding to the identified contact information is provided within the content item. For example, special formatting may be applied to the potential contacts identified in step 406 that have corresponding contact information. Examples of such special formatting include highlighting, bolding, and/or underlining.

As shown in FIG. 4, a step 412 follows the contact identification process. In this step, the user of the computing device selects a contact within the content item. In particular, the user selects a contact corresponding to the visual indications provided in step 410. This selection may be made through interaction with a user interface device, such as a mouse, keyboard, and/or touch screen. For instance, this selection may involve a left mouse click. Alternatively, this selection may simply involve placing a mouse cursor at a contact.

As described above, when automatic contact identification is not performed, operation proceeds from step 403 to step 414. Accordingly, in step 414, the user selects contact in the form of a text string (i.e., one or more characters) within the content item that the user recognizes as being associated with a contact. This text string may be, for example, a recognizable name, telephone number, SMS number, e-mail address, or URL. This selection may be made through interaction with a user interface device, such as a mouse, keyboard, and/or touch screen. For instance, this selection may involve a left mouse click. Alternatively, this selection may simply involve placing a mouse cursor at a contact.

Following step 414, a step 416 is performed in which contact information corresponding to the selected text string is obtained. This contact information may include, for example, one or more communications channels (such as telephone numbers, SMS numbers, e-mail addresses, or URLs) and/or additional information that are associated with the text string.

In embodiments, step 416 comprises inter-device communication. For example, step 416 may involve the computing device sending a request for contact information to the mobile communications device. Accordingly, this request includes the text string selected in step 414. In response to this request, the mobile communications device searches (e.g., within its address book) for the corresponding contact information. The mobile communications device then sends any such information to the computing device.

FIG. 4 shows that a step 418 follows both steps 412 and 416. In step 418, the selection made in either of steps 412 or 414 is activated by the user. This step may involve interaction with a user interface device, such as a mouse, keyboard, and/or touch screen to provide communications options for the selected contact. For example, such interaction may include, for example, a right mouse click of the selected contact. Alternatively, this selection may simply involve placing (or continuing to position) the mouse cursor at the selected contact to provide a pop pop-up window menu similar to tool tips).

In a step 420, the computing device provides the user with a menu. This menu displays one or more connection channels that are related to the selected contact. For instance, a selected contact may have multiple telephone and/or messaging numbers. Based on the menu provided in step 420, the user selects one of these connection channels in a step 422.

One of these connection channels may be indicated as a default channel to provide for efficient user selection. For instance, an abbreviated user input could be used to select the default connection channel. Also, in embodiments, techniques other than conventional menu-selection may be employed to select from among multiple channels. Such techniques may involve particular keystrokes and/or mouse actions. For example, a right mouse click on an identified contact may provide a submenu with the option to place a voice call and send an SMS message, while a left mouse click may initiate a call immediately. As a further example, a left mouse click while holding down the SHIFT key may send an SMS message.

As shown in FIG. 4, the user is provided with an opportunity in a step 424 to add a message or editing the portion of the content item that may have been selected in step 404. In embodiments, this opportunity is in the form of a message window.

In a step 426, the computing device transmits a communications directive to the mobile communications device. This directive includes the desired connection channel that was selected in step 422. According to this directive, a step 428 is performed in which the mobile communications device establishes communications across the desired connection channel. In embodiments, these communications may include a message added in step 424 as well a content item portion that may have been selected in step 404 and edited in step 424.

In a further embodiment, communication is established in step 428 across the desired connection channel but also back to computing device 202. This way, mobile communications device 204 may work as a wireless modem (or relay) between computing device 202 and a network or a network server.

IV. USER INTERFACE EXAMPLES

Figure 5:
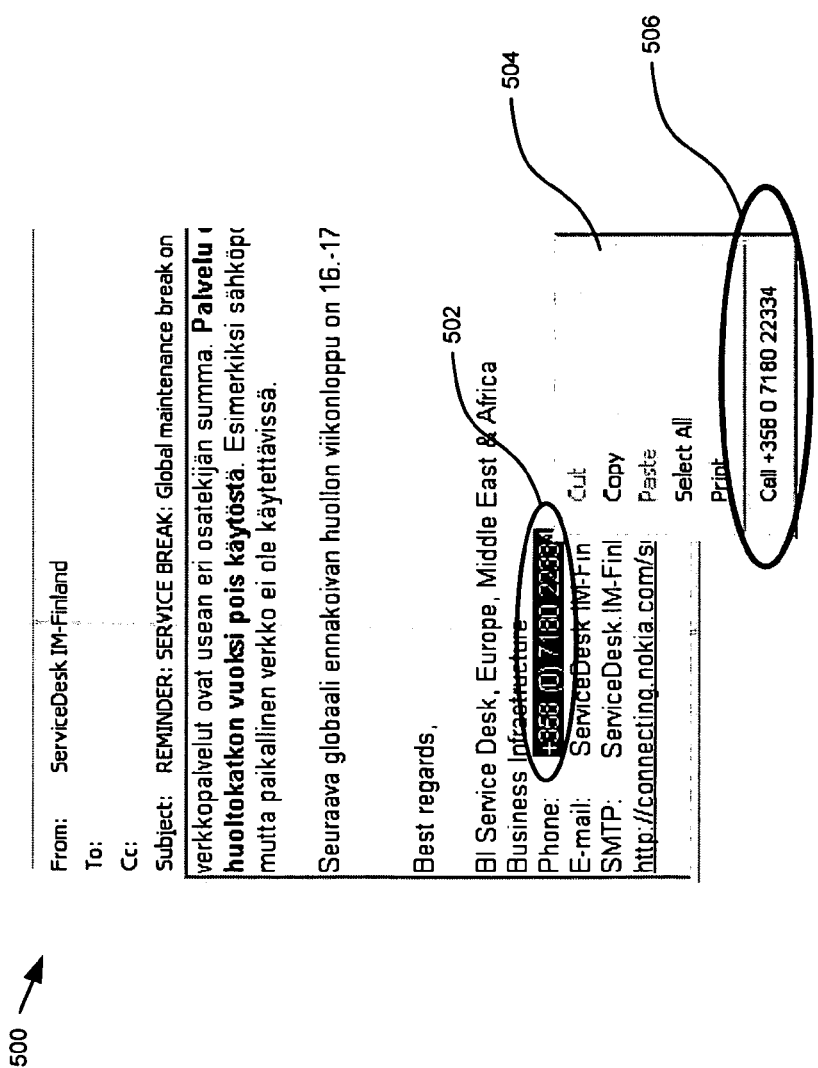
FIGS. 5-8 are exemplary user displays, according to embodiments of the present invention.

FIGS. 5-8 show exemplary displays that may be output on a device, such as computing device 202. For instance, FIG. 5 shows an e-mail 500 having a phone number 502. As indicated by its highlighting, phone number 502 has been selected by the device's user. With reference to FIG. 4, this user selection may be performed in step 414.

Through activation (e.g., a right mouse click) on highlighted phone number 502, a pull-down menu 504 is displayed. In the context of FIG. 4, menu 504 is displayed through performance of step 420. As shown in FIG. 5, menu 504 includes an item 506. This item provides an option to call selected phone number 502. Upon selection of this option, phone number 502 is called. This call may be initiated by a directive, such as is described above with reference to step 428.

Figure 6:
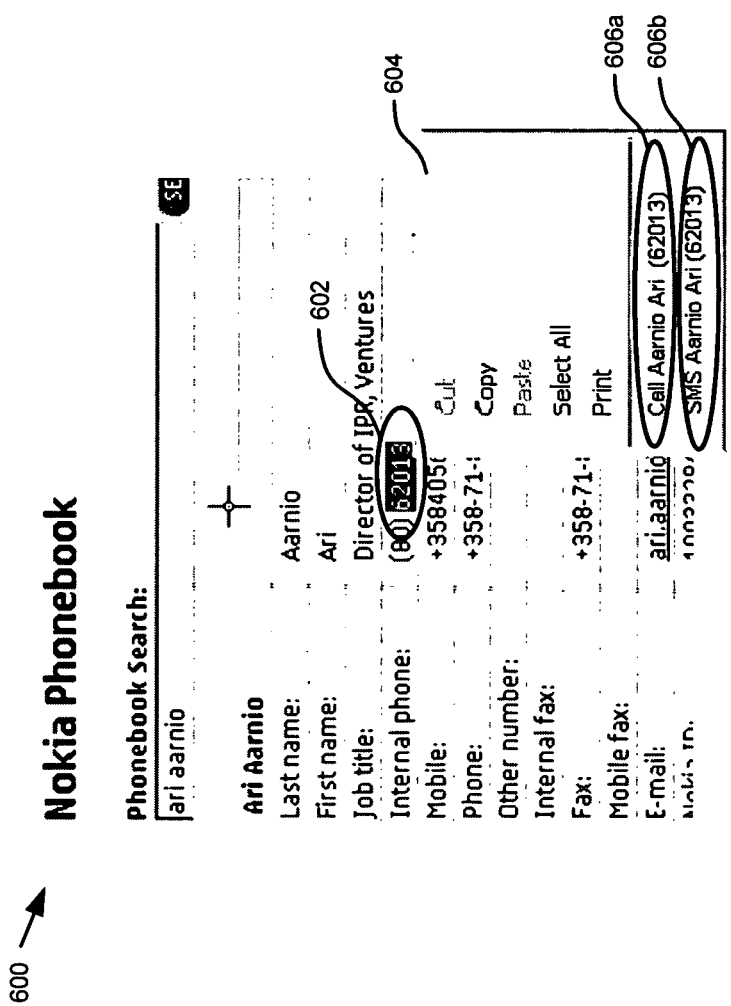

In a similar manner, FIG. 6 shows an entry 600 from an electronic phonebook application. In this entry, a phone number 602 has been selected, as indicated by being highlighted. Based on this selection, a menu 604 is displayed. This menu includes items 606a and 606b, each providing a connection channel. For instance, item 606a provides a voice call channel, while item 606b provides an SMS message channel. Upon selection of one of these items, a corresponding communication will be initiated.

Figure 7A:
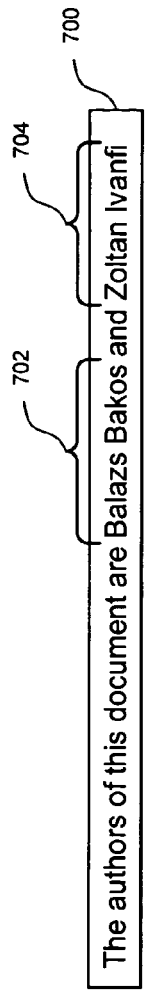
Figure 7B:
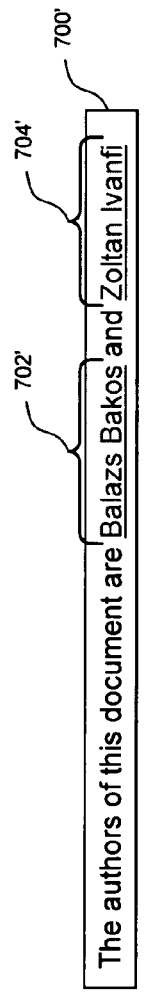

As described above with reference to FIG. 4, contacts may be automatically identified. FIGS. 7A and 7B provide illustrations of automatic contact identification from the perspective of a device user. In particular, FIG. 7A shows a text string 700. This text string includes names 702 and 704. These names are identified as contacts, through an identification technique, such as the one of steps 404 through 410 in FIG. 4.

This automatic identification produces a resultant text string 700', as shown in FIG. 7B. String 700' includes highlighted names 702' and 704', which are displayed to the user with underlining. Upon this identification, the user may efficiently initiate communications to these contacts.

Figure 8:
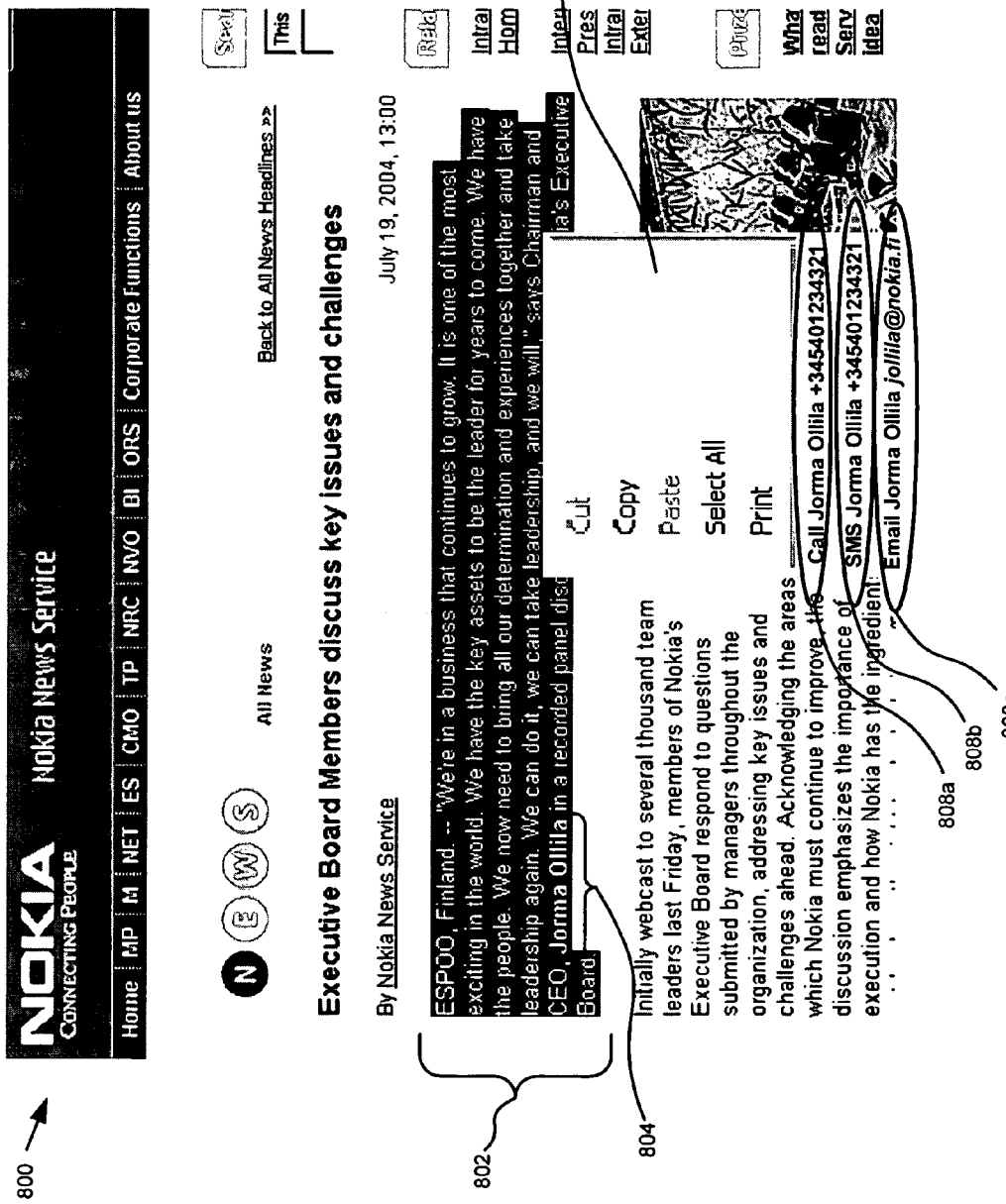

A further example of automatic contact identification is provided in FIG. 8. In this example, a web page 800 includes a portion 802 that may be selected during performance of step 404. Within this portion, a contact 804 is automatically identified and visually indicated with boldfaced text. This identification and indication occur, for example, through performance of steps 404 through 410.

From this identification, FIG. 8 shows that the user has selected and activated contact 804. Accordingly, a menu 806 is displayed, for example, through the performance of step 420. Menu 806 includes an item 808a providing a voice call channel, an item 808b providing an SMS message channel, and an item 808c providing an e-mail address. Upon selection of one of these items, a corresponding communication will be initiated.

V. Radio Frequency Identification

Aspects of the present invention may employ radio frequency identification (RFID) communications between devices such as computing device 202 and mobile communications device 204. RFID technology involves a reader that utilizes electromagnetic energy to wirelessly solicit information from one or more tags that are either touching the reader or are within a predetermined range of the reader. This soliciting of information is referred to herein as an interrogation. Through an interrogation, a reader may receive tag identifiers (e.g., tag ID numbers) as well as other additional information. Thus, a reader can perform interrogations to determine the presence and identity of one or more tags. Moreover, through interrogation, a reader can poll tag-equipped devices for communications.

A reader may transmit interrogation signals in the form of clock pulses that provide receiving tags with a guide for communicating (i.e., for transmitting reply signals) back to the reader. These reply signals may be modulated backscatter reflections of the interrogation signals.

Figure 9:
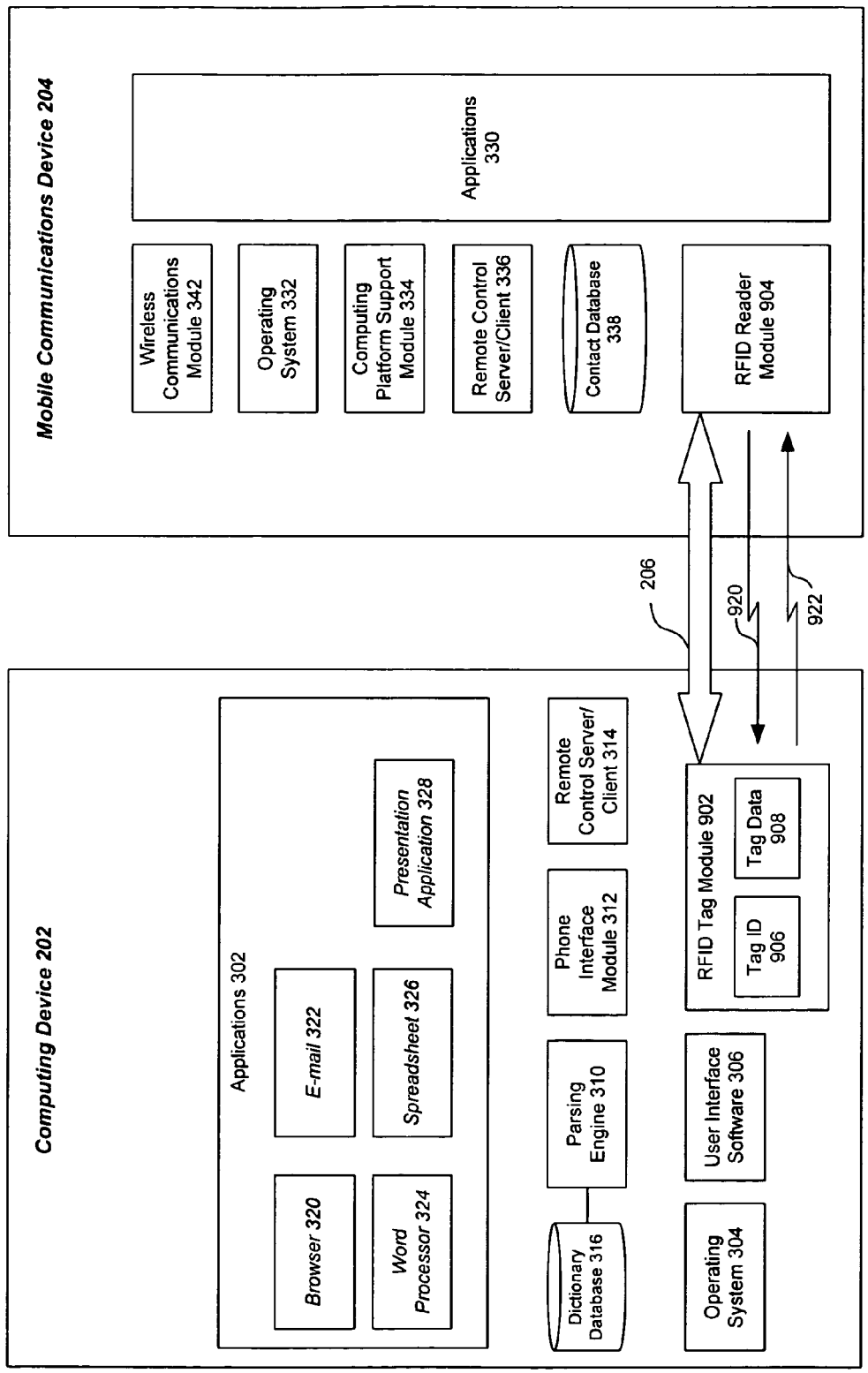
FIG. 9 is a block diagram showing an architecture of databases and software components, according to embodiments of the present invention.

Referring again to FIGS. 2 and 3, computing device 202 may include RFID tag capabilities and mobile communications device 204 may include an RFID reader capabilities. Accordingly, FIG. 9 is a diagram of an architecture that may employed in computing device 202 and mobile communications device 204. This architecture is similar to the architecture of FIG. 3. However, within computing device 202, link controller 308 is replaced with RFID tag 902. Also, within mobile communications device 204, link controller 340 is replaced with RFID reader 904.

As shown in FIG. 9, a tag ID 906 is associated with RFID tag 902. Also, additional tag data 908 may be associated with RFID tag 902. Tag ID 906 and tag data 908 are information fields stored by computing device 202 These fields may be stored in a general purpose memory, or in a special purpose storage medium (e.g., one or more registers). Upon the receipt of an RFID interrogation signal, these fields are transmitted in the form of a reply.

In aspects of the present invention, one or both of these fields may be given values based on a desired communication with mobile communications device 204 (or other proximate devices). For instance, computing device 202 may assign values to tag ID 906 and/or tag data 908 in order for requests 220 and/or directives 224 to be sent. Also, computing device 202 may change or "recode" these values as the desire to transmit different requests or directives arises.

Accordingly, FIG. 9 shows an interrogation signal 920 being sent from mobile communications device 204 to computing device 202. In response, computing device 202 transmits a reply signal 922, which is received by device 204.

Interrogation signal 920 may be a solicitation for communications for device 202 or a response to a communication from device 202.

When interrogation signal 920 is a solicitation, computing device 202 may send a reply signal 922 having values of tag ID 906 and/or tag data 908 that conveys, for example, requests 220 and/or directives 224. For instance, a reply signal 922 may include selected communication information and/or content. However, when interrogation signal 920 is a response to a communication from device 202, it may provide previously requested information and/or an acknowledgment that a prior directive was fulfilled.

Computing device 202 may include passive tag capabilities and may generate reply signal 922 through backscatter modulation of interrogation signal 920. Alternatively, computing device 902 may include active tag capabilities and may generate reply signal 922 through active transmission. This advantageously provides for a greater communications range between devices 202 and 204.

Communications device 204 may repeatedly send interrogation signals to provide computing device 202 with ample opportunities to send requests and/or directives. In contrast with some short-range wireless communications techniques, such RFID communications are quick and simple. For instance, in embodiments, these RFID communications do not require pairing or authentication processes before the commencement of communications.

In an alternate embodiment of the present invention, the RFID tag and reader modules may be switched. More particularly, RFID reader module 904 may be included in computing device 202, and RFID tag module 902 may be included in mobile communications device 204. This arrangement may be employed when communication information and/or content is transmitted from mobile communication device 204 to computing device 202.

In a further embodiment of the present invention, computing device 202 and mobile communications device 204 may each include both an RFID tag module and an RFID reader module. In such arrangements, communication information and/or content can be transmitted from the mobile communication device to the computing device and vice versa.

VI. Communications Device Implementation

Figure 10:
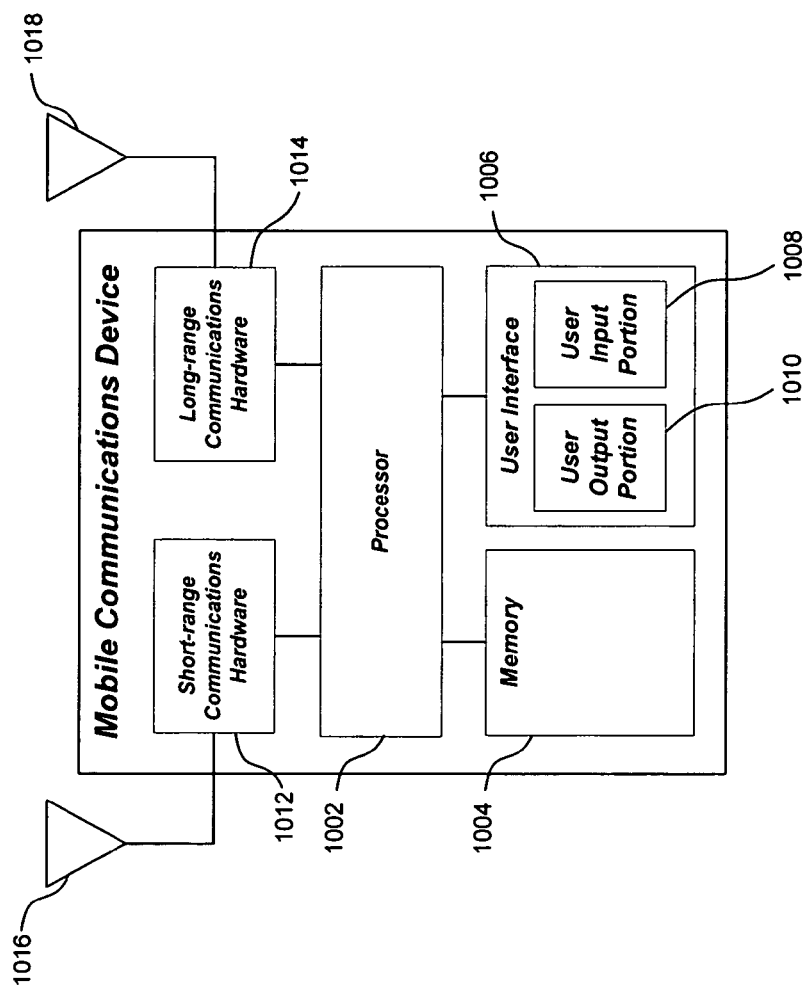
FIG. 10 is a diagram of an exemplary mobile communications device, according to embodiments of the present invention.

As described above, devices that employ features of the present invention may be implemented in hardware, software, firmware, or any combination thereof. For instance, one such implementation of mobile communications device 204 is shown in FIG. 10. This implementation includes a processor 1002, a memory 1004, and a user interface 1006. In addition, the implementation of FIG. 10 includes a short-range communications hardware portion 1012, a long-range communications hardware portion 1014, as well as antennas 1016 and 1018. These components may be implemented as described above.

Processor 1002 controls device operation. As shown in FIG. 10, processor 1002 is coupled to hardware portions 1012 and 1014. Processor 1002 may be implemented with one or more microprocessors that are each capable of executing software instructions stored in memory 1004, for example, as a computer system.

Memory 1004 includes random access memory (RAM), read only memory (ROM), and/or flash memory, and stores information in the form of data and software components (also referred to herein as modules). These software components include instructions that can be executed by processor 1002. Various types of software components may be stored in memory 1004. For instance, memory 1004 may store software components that control the operation of hardware portions 1012 and 1014. Also, memory 1004 may store software components that provide for the functionality of the device 204 elements shown in FIG. 3.

For instance, memory 1004 may store components of user interface software 306 that control the exchange of information through user interface 1006. As shown in FIG. 10, user interface 1214 is also coupled to processor 1002. User interface 1006 facilitates the exchange of information between the device and its user. Accordingly, FIG. 10 shows that user interface 1006 includes a user input portion 1008 and a user output portion 1010.

User input portion 1008 may include one or more devices that allow a user to input information. Examples of such devices include keypads, touch screens, and microphones. User output portion 1010 allows a user to receive information from the device. Thus, user output portion 1010 may include various devices, such as a display, and one or more audio speakers (e.g., stereo speakers) and a audio processor and/or amplifier to drive the speakers. Exemplary displays include color liquid crystal displays (LCDs), and color video displays.

FIG. 10 shows that short-range communications hardware portion 1012 is coupled to antenna 1016. Short-range communications hardware portion 1012 includes electronics, such as transceivers, filters, and/or amplifiers. Such electronics allow the mobile communications device (in conjunction with antenna 1012) to engage in bi-directional or unidirectional short-range RF communications with remote devices.

Examples of such short-range communications include Bluetooth, WLAN, UWB, WiFi, and RFID communications. Accordingly, in embodiments of the present invention, hardware portion 1012 may include RFID tag and/or RFID reader components. Examples of such components may include transceivers, filters, and/or amplifiers. In addition, for passive tag capabilities, such components may include a coil for receiving power from interrogation signals.

Long-range communications hardware portion 1014 is coupled to antenna 1016 and includes electronics, such as a transceiver, which allows the device (in conjunction with antenna 1016) to engage in bi-directional long-range RF communications. Such communications may include wireless telephony and data transfer with communications resources, such as cellular base stations and satellites.

The elements shown in FIG. 10 may be coupled according to various techniques. One such technique involves coupling hardware portions 1012 and 1016, processor 1002, memory 1004, and user interface 1006 through one or more bus interfaces. In addition, each of these components is coupled to a power source, such as a removable and/or rechargeable battery pack (not shown).

VII. Computing Device Implementation

Figure 11:
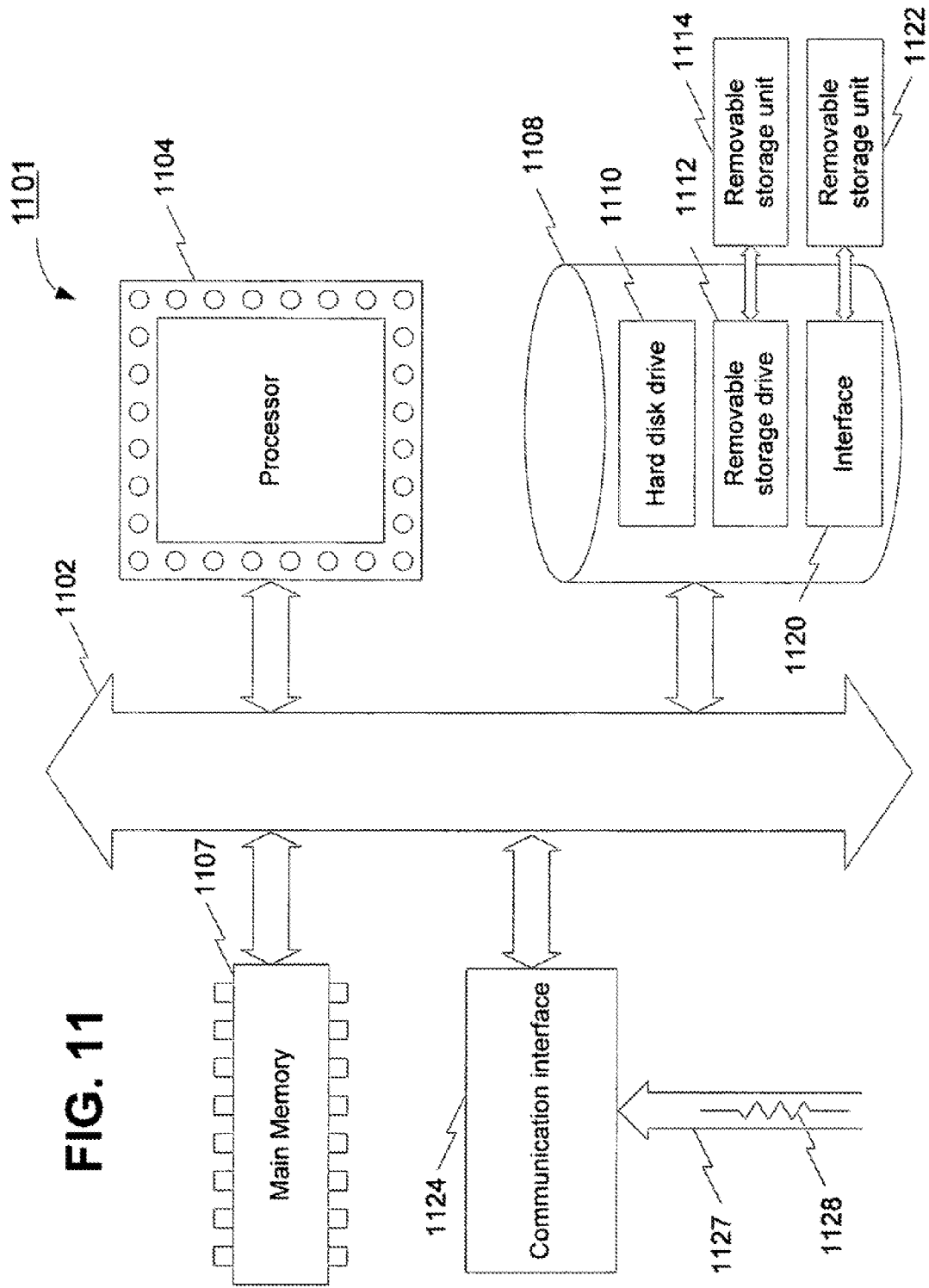
FIG. 11 is a diagram of an exemplary computer system, according to embodiments of the present invention.

An exemplary implementation of computing device 202 is shown in FIG. 11 as a computer system 1101. Computer system 1101 represents any single or multi-processor computer. Single-threaded and multi-threaded computers can be used. Unified or distributed memory systems can be used.

Computer system 1101 includes one or more processors, such as processor 1104. One or more processors 1104 can execute software implementing the functionality described above. Each processor 1104 is connected to a communication infrastructure 1102 (for example, a communications bus, cross-bar, or network). Various software embodiments are described in terms of this exemplary computer system. After reading this description, it will become apparent to a person skilled in the relevant art how to implement the invention using other computer systems and/or computer architectures.

Computer system 1101 also includes a main memory 1107 which is preferably random access memory (RAM). Computer system 1101 may also include a secondary memory 1108. Secondary memory 1108 may include, for example, a hard disk drive 1110 and/or a removable storage drive 1112, representing a floppy disk drive, a magnetic tape drive, an optical disk drive, etc. Removable storage drive 1112 reads from and/or writes to a removable storage unit 1114 in a well known manner. Removable storage unit 1114 represents a floppy disk, magnetic tape, optical disk, etc., which is read by and written to by removable storage drive 1112. As will be appreciated, the removable storage unit 1114 includes a computer usable storage medium having stored therein computer software and/or data.

In alternative embodiments, secondary memory 1108 may include other similar means for allowing computer programs or other instructions to be loaded into computer system 1101. Such means can include, for example, a removable storage unit 1122 and an interface 1120. Examples can include a program cartridge and cartridge interface (such as that found in video game devices), a removable memory chip (such as an EPROM, PROM, or flash memory) and associated socket, and other removable storage units 1122 and interfaces 1120 which allow software and data to be transferred from the removable storage unit 1122 to computer system 1101.

Computer system 1101 may also include a communications interface 1124. Communications interface 1124 allows software and data to be transferred between computer system 1101 and external devices via communications path 1127. Examples of communications interface 1124 include a modem, a network interface (such as Ethernet card), Bluetooth and/or other short-range wireless network modules, etc. In addition, communications interface 1124 may include an RFID reader and/or RFID tag.

Software and data transferred via communications interface 1124 are in the form of signals 1128 which can be electronic, electromagnetic, optical or other signals capable of being received by communications interface 1124, across communications path 1127. Note that communications interface 1124 provides a means by which computer system 1101 can interface to a network such as the Internet.

The present invention can be implemented using software running (that is, executing) in an environment similar to that described above with respect to FIG. 11. In this document, the term "computer program product" is used to generally refer to removable storage units 1114 and 1122, a hard disk installed in hard disk drive 1110, or a signal carrying software over a communication path 1127 (wireless link or cable) to communication interface 1124. A computer useable medium can include magnetic media, optical media, or other recordable media, or media that transmits a carrier wave or other signal. These computer program products are means for providing software to computer system 1101.

Computer programs (also called computer control logic) are stored in main memory 1107 and/or secondary memory 1108. Computer programs can also be received via communications interface 1124. Such computer programs, when executed, enable the computer system 1101 to perform the features of the present invention as discussed herein. In particular, the computer programs, when executed, enable the processor 1104 to perform the features of the present invention. Accordingly, such computer programs represent controllers of the computer system 1101.

The present invention can be implemented as control logic in software, firmware, hardware or any combination thereof. In an embodiment where the invention is implemented using software, the software may be stored in a computer program product and loaded into computer system 1101 using removable storage drive 1112, hard drive 1110, or interface 1120. Alternatively, the computer program product may be downloaded to computer system 1101 over communications path 1127. The control logic (software), when executed by the one or more processors 1104, causes the processor(s) 1104 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

VIII. CONCLUSION

While various embodiments of the present invention have been described above, it should be understood that they have been presented by way of example only, and not in limitation. Accordingly, it will be apparent to persons skilled in the relevant art that various changes in form and detail can be made therein without departing from the spirit and scope of the invention.

For instance, the present invention may be employed with alternative arrangements of devices. Such alternative arrangements may include two portable communications devices (e.g., two wireless phones) instead of a computing device and a portable communications device. These devices may communicate through a proximity (e.g., Bluetooth, WLAN, RFID, etc.) connection. Furthermore, while FIGS. 3 and 9 are described mainly in terms of software, these architectures may be implemented in hardware, software, firmware, or any combination thereof.

Thus, the breadth and scope of the present invention should not be limited by any of the above-described exemplary embodiments, but should be defined only in accordance with the following claims and their equivalents.

What is claimed is:
1. A method, comprising:
  (a) receiving in a first device from a user, a selection of a contact within a content item;
  (b) requesting, by the first device, contact information stored in a second communications device, said contact information including one or more connection channels corresponding to said selected contact, and receiving said contact information;
  (c) indicating to the user said one or more connection channels associated with the received contact information;
  (d) receiving from the user, a selection of a designated connection channel from the one or more indicated connection channels; and
  (e) instructing the second communications device to establish communications with the selected contact across the designated connection channel and relay the communications with the selected contact back to the first device.
2. The method of claim 1, further comprising:
automatically identifying one or more contacts within a portion of the content item.
3. The method of claim 2, further comprising:
providing a visual indication of the one or more automatically identified contacts.

4. The method of claim 2, wherein step (e) comprises instructing the second communications device to send the portion of the content item across the designated connection channel.

5. The method of claim 4, further comprising:
providing the user with an opportunity to edit the portion of the content item.

6. The method of claim 4, wherein step (e) comprises transmitting the portion of the content item to the second communications device.

7. The method of claim 1, further comprising:
providing the user with an opportunity to enter a message; and
wherein step (e) comprises instructing the second communications device to send the message across the designated connection channel.

8. The method of claim 1, wherein step (c) comprises displaying a pull-down menu, the pull-down menu including the one or more connection channels associated with the contact.

9. The method of claim 1, further comprising:
sending to the second communications device a query regarding the selected contact; and
in response to the query, receiving at least one of the one or more connection channels from the second communications device.

10. The method of claim 1, wherein the one or more connection channels associated with the contact includes at least one of a telephone number, an SMS number, an e-mail address, an Internet Protocol (IP) address, and a uniform resource locator (URL).

11. The method of claim 1, wherein the content item is one of a word processing document, an e-mail, a web page, and a spreadsheet.

12. The method of claim 1, wherein step (e) comprises sending a response to a radio frequency identification (RFID) interrogation signal from the second communications device.

13. The method of claim 1, wherein step (e) comprises transmitting a directive to the second communications device across a communications interface.

14. The method of claim 1, wherein step (d) comprises receiving through an abbreviated user input, a selection of a default connection channel as the designated connection channel.

15. The method of claim 1, wherein the contact includes at least one of a name of a person, a name of a company, and a name of an entity.

16. The method of claim 1, wherein the second communications device is a mobile communications device.

17. The method of claim 1, wherein step (e) comprises transmitting information of the designated connection channel to the second communications device.

18. The method of claim 17, wherein step (e) further comprises transmitting the information of the designated connection across a short range wireless connection.

19. An apparatus comprising,
a user interface in a first device configured to present a content item to a user, and to receive from the user a selection of a contact within the content item;
a controller in the first device configured to request contact information stored in a second communications device, said contact information including one or more connection channels associated with the selected contact, and to instruct the second communications device to establish communications with the selected contact across a designated connection channel and relay the communications with the selected contact back to the first device;
wherein the designated connection channel is selected by the user through interaction with the user input of the first device.

20. The apparatus of claim 19, further comprising a parsing engine configured to identify one or more potential contacts from the content item.

21. The apparatus of claim 19, wherein the controller is further configured to send to the second communications device a query regarding the selected contact; and in response to the query, to receive at least one of the one or more connection channels from the second communications device.

22. The apparatus of claim 19, wherein the one or more connection channels associated with the contact includes at least one of a telephone number, an SMS number, an e-mail address, an Internet Protocol (IP) address, and a uniform resource locator (URL).

23. The apparatus of claim 19, wherein the content item is one of a word processing document, an e-mail, a web page, and a spreadsheet.

24. The apparatus of claim 19, wherein the controller is configured to instruct the second communications device to establish communications across the designated connection channel in response to a radio frequency identification (RFID) interrogation signal, wherein the RFID interrogation signal is received from the second communications device.

25. The apparatus of claim 19, wherein the user interface is further configured to provide a visual indication of one or more identified contacts within a portion of the content item.

26. The apparatus of claim 19, wherein the user interface is further configured to provide the user with an opportunity to enter a message; and
wherein the controller is further configured to instruct the second communications device to send the message across the designated connection channel.

27. The apparatus of claim 19, wherein the controller is further configured to instruct the second communications device to establish communications across the designated connection channel by transmitting a directive to the second device across a communications interface.

28. The apparatus of claim 27, wherein the communications interface includes a short range wireless connection.

29. The apparatus of claim 19, wherein the designated connection channel is a default connection channel selected through an abbreviated user input.

30. A computer-readable medium having computer program logic recorded thereon for enabling a processor in a computer system to initiate communications, the computer program logic comprising instructions which, when executed by the processor, enable the processor to:
receive in a first device from a user, a selection of a contact within a content item;
request by the first device contact information stored in a second communications device, said contact information including one or more connection channels corresponding to said selected contact, and receive said contact information;
indicate to the user said one or more connection channels associated with the received contact information;
receive from the user, a selection of a designated connection channel from the one or more indicated connection channels; and
instruct the second communications device to establish communications with the selected contact across the designated connection channel and relay the communications with the selected contact back to the first device.

31. A system, comprising:
- a first device configured to present a content item to a user, and to receive from the user a selection of a contact within the content item;
- a second communications device configured to establish communications across a designated connection channel, the designated connection channel selected from one or more connection channels that correspond to the selected contact; and
- a communications link between the first device and the second communications devices;
- wherein, through employment of the communications link, the first device requests contact information stored in the second communications device, said contact information including the one or more connection channels that correspond to the selected contact, and directs the second communications device to establish communications with the selected contact across the designated connection channel and relay the communications with the selected contact back to the first device.

32. The system of claim 31, wherein the first device is further configured to automatically identify one or more contacts within a portion of the content item, wherein the selected contact is from the one or more identified contacts.

33. The system of claim 32, wherein the second communications device includes a contact database; and
- wherein, in response to a request from the first device, the second communications device sends the one or more identified contacts to the first device across the communications link.

34. The system of claim 32, wherein the first device is further configured to provide the user with a visual indication of the one or more automatically identified contacts.

35. The system of claim 31, wherein the communications link is a Bluetooth link.

36. The system of claim 31, wherein the communications link is a wireless local area network (WLAN) link.

37. The system of claim 31, wherein the communications link employs radio frequency identification (RFID) communications.

38. The system of claim 31, wherein the designated connection channel is selected from a telephone number, an SMS number, an e-mail address, and a uniform resource locator (URL).

39. The apparatus of claim 19, wherein the first device is one or more of a desktop computer, a laptop computer, a television device, a personal video recorder, a digital video recorder, a personal digital assistant, a mobile communications device, a portable audio or video device, a digital camera, a digital camcorder, and a global positioning system device, and wherein the second communications device is one or more of a mobile phone and a personal digital assistant.

40. An apparatus comprising at least one processor and at least one memory including computer program code, the at least one memory and the computer program code configured to, with the at least one processor, cause the apparatus at least to:
- (a) receive in a first device from a user, a selection of a contact within a content item;
- (b) request, by the first device, contact information stored in a second communications device, said contact information including one or more connection channels corresponding to said selected contact, and receive said contact information;
- (c) indicate to the user said one or more connection channels associated with the received contact information;
- (d) receive from the user, a selection of a designated connection channel from the one or more indicated connection channels; and
- (e) instruct the second communications device to establish communications with the selected contact across the designated connection channel and relay the communications with the selected contact back to the first device.

* * * * *